March 10, 1953 H. S. INGHAM ET AL 2,631,058
SPRAY TUBE FOR IRRIGATING DEVICES
Filed May 17, 1950 2 SHEETS—SHEET 1
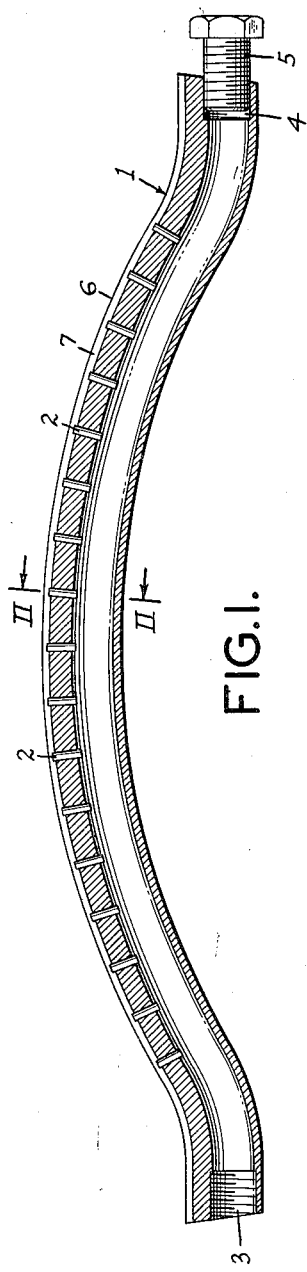
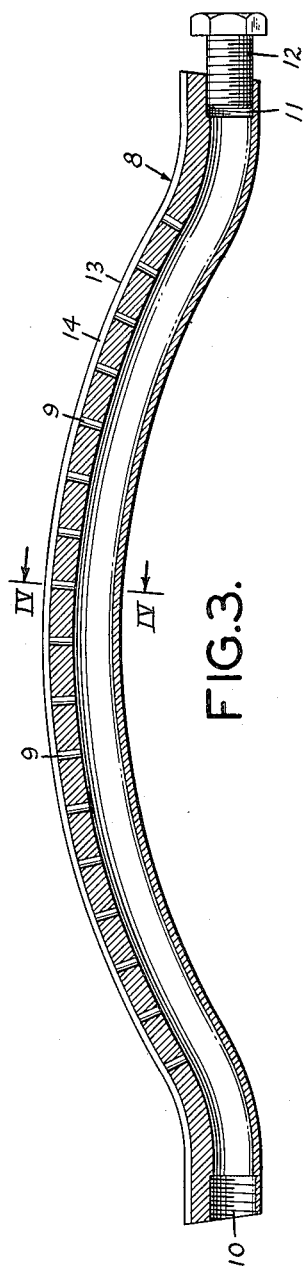
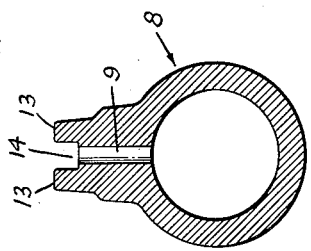
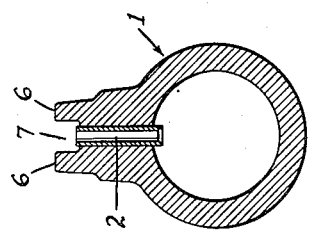
INVENTORS.
HERBERT S. INGHAM
CHARLES K. WILSON
BY
ATTORNEYS.

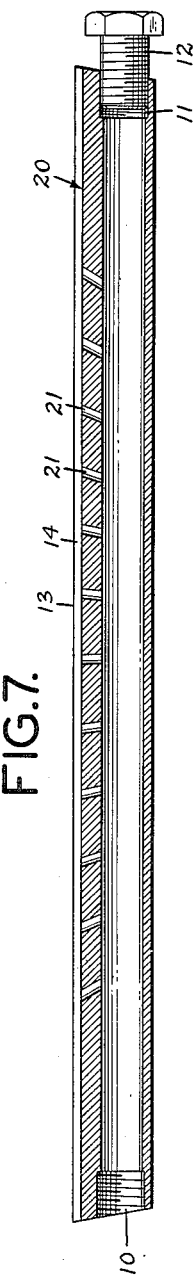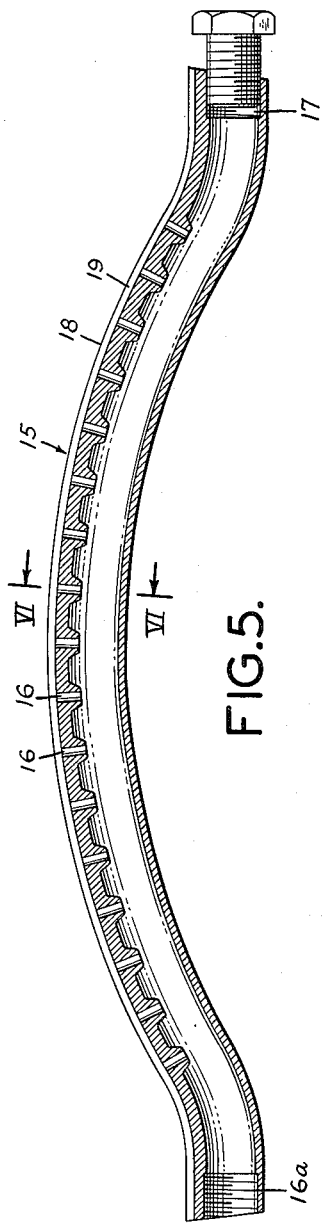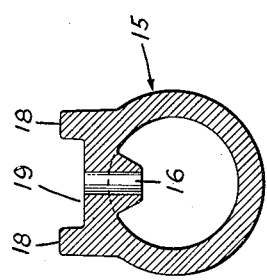

Patented Mar. 10, 1953

2,631,058

UNITED STATES PATENT OFFICE 2,631,058

SPRAY TUBE FOR IRRIGATING DEVICES

Herbert S. Ingham, Roslyn Estates, and Charles K. Wilson, East Williston, N. Y., assignors to Metallizing Engineering Co. Inc., Long Island City, N. Y., a corporation of New Jersey Application May 17, 1950, Serial No. 162,404

8 Claims. (Cl. 299—62)

This invention relates to new and useful improvements in spray tube for irrigating devices of the oscillating tube type.

Oscillating sprinklers are frequently used for watering lawns and the like and include a tube through which irrigating water passes and a number of nozzles located longitudinally along the tube, the nozzles being fed with water from the tube. This tube forms a manifold for supplying water to a row of individual spray nozzles. It is common practice to set some of the nozzles at different angles to the axis of oscillation so that the water emerging from the nozzles diverges with the shape of a flat fan. This fan-like spray pattern is obtained either by the use of a straight spray tube with nozzles set into it at different angles, or by a spray tube bent into the shape of an arch with the nozzles set normal to the arc of the spray tube at each point along its length. Although each of the two types of spray tubes mentioned above has been used, the bent or arch type of tube has been by far the most popular for small inexpensive lawn sprinklers.

Past constructions permit an influx of air to reach the water jets at the end of the nozzles thus causing turbulence. Turbulence at the end of the nozzles however causes the jets to spread or fog rather than to emerge as sharply defined streams, thereby appreciably reducing the maximum possible watering area. At the same time evaporation losses are increased by the fogging and considerable amounts of water may become so finely dispered in the air that they are easily moved by the lightest wind. With such constructions it is not possible to control the area to be watered to the desired extent.

In order to overcome this difficulty individual water nozzles have sometimes been cupped or counter-bored at the discharge end. Cupped end nozzles however have been used only on the most expensive sprinklers, due to the high cost of obtaining nozzles of this type. This high cost results not only from the cost of counter-boring each of many nozzles, but also because the nozzles must be much larger to provide room for a counter-bore of effective size.

Even though the cupped nozzles have been used on expensive sprinklers, such as for estates, nurseries, etc. they are so expensive that they are out of the price range of the ordinary oscillating type lawn sprinklers, such as are sold for use on home lawns.

One object of this invention is to provide a spray tube for an oscillating type irrigating device which is simpler in construction and which overcomes many of the structural defects of previously known spray tubes of this type.

Another object of this invention is to provide such a spray tube with nozzles which have all the advantages of cupped type nozzles at a lower cost of manufacture than those of previously known spray tubes of this type.

These and other objects of this invention will become apparent from the following description taken in conjunction with the drawings in which:

Fig. 1 is a central longitudinal cross-sectional view of a spray tube in accordance with this invention;

Fig. 2 is a cross-section of the showing of Fig. 1 in the plane II—II of Fig. 1;

Fig. 3 is a central longitudinal cross-section of a spray tube showing an alternative embodiment of this invention;

Fig. 4 is a cross-section of the showing in Fig. 3 taken in the plane IV—IV of Fig. 3;

Fig. 5 is a central longitudinal cross-section of a still further alternative embodiment of this invention;

Fig. 6 is a cross-section of the showing in Fig. 5 taken in the plane VI—VI of Fig. 5;

Fig. 7 is a central longitudinal cross-section of still another alternative embodiment of the invention.

Referring to Figs. 1 and 2—1 is the tube body into which individual nozzle liners 2 have been pressed. Tube body 1 is threaded at each end at 3 and 4. Threaded plug 5 stops off one end of the spray tube. This plug may be used as a pivot for oscillation if desired and may be removed for cleaning purposes. Inlet water connection (not shown) is connected by means of a thread to the tube at 3.

Spray tube body 1 is provided with a thicker section which provides sufficient wall thickness for insertion of nozzles 2. Spray tube body 1 is provided with ridges 6 running longitudinally throughout its length and forming channel 7. Nozzles 2 terminate with their discharge ends in channel 7.

In operation, water enters the tube from inlet connection (not shown) at 3 and is distributed by the tube to individual nozzles 2. Water emerging from the outlet ends of nozzles 2 is protected from disturbing air currents by means of raised ridges 6.

An alternative embodiment of this invention is shown in Figs. 3 and 4. This embodiment of the invention is similar to that illustrated above, except that the nozzles are formed directly in the spray tube body without the use of nozzle liners. Referring to the Figs. 3 and 4, 8 is the spray tube body in which nozzles 9 have been formed. The spray tube is threaded at 10 for a water inlet connection (not shown) and also threaded at 11 for plug 12. The wall thickness of the spray tube body is made sufficiently thick to provide the desired length for nozzles 9. Raised ridges 13 are provided extending throughout the length of the spray tube body, forming a channel 14 into which nozzles 9 discharge.

Another alternative embodiment of the invention is illustrated in Figs. 5 and 6. This construction is similar to those previously described except that the nozzles, while made a part of the spray tube body, are extruded down into the tube so as to give them greater length than the tube wall thickness.

Referring to Figs. 5 and 6, 15 is a spray tube body in which nozzles 16 are formed. Nozzles 16 are characterized by being formed from the thin upper wall of spray tube body 15 to extend down into the tube. The ends of the spray tube are threaded at 16a and 17 for use as previously described in connection with other embodiments of the invention. Ridges 18 extend upward from the spray tube throughout its length to form channel 19.

A still further embodiment of the invention is illustrated in Fig. 7. The construction of Fig. 7 is similar to that shown in Fig. 3 except that the spray tube is straight rather than curved and the nozzles are set at angles so as to provide a spray pattern in the form of a fan. Referring to Fig. 7, 20 is a spray tube body in which nozzles 21 are formed. The central nozzle is normal to the axis of the tube and nozzles on each side of center are set at succeedingly larger angles from normal as illustrated in Fig. 7.

Spray tubes constructed in accordance with this invention have many advantages not heretofore found. Although the reasons are not entirely apparent, the channel into which the nozzles emerge satisfactorily performs the same function as the circular counter-bore or cup of previously known types of nozzles. Water from the nozzles in spray tubes constructed in accordance with this invention emerges in clear sharp streams which will project with a maximum of distance and a minimum of fogging.

A channel construction in accordance with this invention has a number of advantages over the older cup nozzle construction. The spray tube in accordance with this invention can be constructed at considerably less expense than previous constructions. For instance, in all of the embodiments shown in this invention the spray tube body can be die extruded in continuous lengths from metals such as aluminum alloys. The channel construction makes for easier cleaning of the tops of the nozzles and it has been noted that there is a lesser tendency for dirt to collect in the channel than in the end cups of cupped nozzles.

Where it is desired to provide nozzles of a different material than the spray tube body, then nozzle liners may be easily inserted as illustrated in Figs. 1 and 2. By providing sufficient wall thickness for these liners the necessity for threading into thin wall tubing is eliminated.

While inserted nozzle liners may be pressed flush with the outer wall surface of the spray tube body at the bottom of the channel, it is usually preferable to have the nozzle liners extend slightly above the outer wall. Such construction helps prevent accumulation of dirt at the discharge end of the nozzles which might cause turbulence and affect their performance.

Where nozzle liners are not required the nozzles themselves may be of any desired length by providing the desired wall thickness in the tubing for the nozzles as illustrated in Figs. 3 and 4. For some water pressures the length of these nozzles is critical to their performance and it is important that they be of the proper length.

One means of obtaining relatively long nozzles formed from the same piece as the spray tube body is illustrated in Figs. 5 and 6. It has been found that it is possible to extrude each nozzle downward into the tube by pressing with a sharp pointed punch against the solid wall of the spray tube body. By selecting the proper punch angle, it is possible to extrude nozzles into the tubing as illustrated in Figs. 5 and 6 with a small individual nozzle tube extending down into the main spray tube and still form the nozzle with the discharge end approximately square with its axis.

Nozzles which extend down into the spray tube have a better general performance than those whose entrances are flush with the spray tube inner wall. There is less turbulence of entrance with this type of nozzle and the emerging water forms a more sharply defined cleaner stream. There is also a lesser tendency for small particles of foreign matter such as sand to enter nozzles which extend below the inner tube wall.

It will thus be seen that spray tubes constructed in accordance with this invention are superior to those previously known and that they can be manufactured at considerably less expense.

Spray tubes in accordance with this invention may be connected to a source of water and supported by any suitable structure. The supporting structure usually supports the spray tube with its axis horizontal (its axis, for instance, being a line connecting the center of threads 3 and 4 as illustrated in Fig. 1). The supporting structure may hold the spray tube so that the fan-like pattern of water jets either extend vertically or to one side or the other of vertical. Ordinarily, the supporting structure includes a motor and an oscillating mechanism so that the spray tube is rotated about its axis through a total angle of about 90 degrees, 45 degrees to each side of vertical. Such mechanism is frequently adjustable so that the amplitude and position of range of oscillation is adjustable. For instance, with some such mechanisms the spray tube may be set to oscillate with the nozzle pointing from vertical to about 60 degrees on one side. It will readily be seen that the improved spray tube in accordance with this invention is of great advantage when used with all such mechanisms for watering the largest possible area with the least loss of water as fog.

The foregoing specific description is for purposes of illustration and not of limitation and it is therefore our intention that the invention be limited only by the appended claims or their equivalents wherein we have endeavored to claim broadly all inherent novelty.

We claim:

1. In a multiple nozzle spray tube for irrigating device of the oscillating tube type, the improvement comprising, in combination with independent motive power for the oscillation of such tube, a spray tube body having a bore for liquid, at least two parallel ridges on said tube body defining a channel therebetween, a multiple number of nozzles in said tube body extending with their discharge ends into said channel and connected with their inlet ends for free liquid passage from said bore, said channel extending substantially continuously along said spray tube body from beyond one end nozzle to beyond the other end nozzle.

2. The improvement in accordance with claim 1 in which said nozzles are defined by individual tubular sections extending into said bore beyond the inner wall of said tube body.

3. The improvement in accordance with claim 1 in which said nozzles comprise individual separate tubes inserted into said body.

4. The improvement in accordance with claim 3 in which said individual nozzle tubes extend into said bore beyond the inner wall of said tube body.

5. The improvement in accordance with claim 3 in which said nozzle tubes extend into said bore beyond the inner wall of said tube body and extend into said channel beyond the outer wall of said tube body.

6. The improvement in accordance with claim 1 in which said nozzles comprise individual nozzle tubes integrally formed with the wall of said tube body, said individual nozzle tubes extending into said bore beyond the inner wall of said tube body.

7. The improvement in accordance with claim 1 in which said ridges are an integral part of said tube body.

8. The improvement in accordance with claim 7 in which said nozzles are defined by individual tubular sections extending into said bore beyond the inner wall of said tube body and extending into said channel beyond the outer wall of said tube body.

HERBERT S. INGHAM.
CHARLES K. WILSON.

REFERENCES CITED

The following references are of record in the file of this patent:

UNITED STATES PATENTS

| Number | Name | Date |
| --- | --- | --- |
| D. 157,315 | Ingham | Feb. 14, 1950 |
| 388,930 | Thayer | Sept. 4, 1888 |
| 460,352 | Reading | Sept. 29, 1891 |
| 690,762 | Papenfus | Jan. 7, 1902 |
| 1,180,807 | Vedder | Apr. 25, 1916 |
| 1,298,655 | Briner | Apr. 1, 1919 |
| 1,751,641 | Lindhorst | Mar. 25, 1930 |
| 2,060,100 | Michelson | Nov. 10, 1936 |
| 2,351,835 | Pick | June 20, 1944 |
| 2,426,603 | Freygang | Sept. 2, 1947 |